(12) United States Patent
Rajauria et al.

(10) Patent No.: US 9,865,405 B2
(45) Date of Patent: Jan. 9, 2018

(54) FIXED CONTACT FOR JOINING A BUS BAR AND A SLIDING CONTACT OF AN ELECTRICAL SWITCHGEAR

(71) Applicant: General Electric Company, Schenectady, NY (US)

(72) Inventors: Samir Rajauria, Uttar Pradesh (IN); Ayyappa Reddy Jakkireddy, Telangana (IN); Guru Moorthy Kurra, Telangana (IN); Lenin Pokkula, Telangana (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 240 days.

(21) Appl. No.: 14/613,003

(22) Filed: Feb. 3, 2015

(65) Prior Publication Data

US 2016/0225545 A1 Aug. 4, 2016

(51) Int. Cl.
*H01H 1/36* (2006.01)
*H01H 9/02* (2006.01)
(Continued)

(52) U.S. Cl.
CPC ............... *H01H 1/36* (2013.01); *H01H 1/62* (2013.01); *H01H 9/02* (2013.01); *H01H 33/025* (2013.01);
(Continued)

(58) Field of Classification Search
CPC ............. H01H 1/36; H01H 9/02; H02B 13/00
(Continued)

(56) References Cited

U.S. PATENT DOCUMENTS 2,824,939 A * 2/1958 Claybourn ............... H02B 1/56
174/16.1
3,603,753 A 9/1971 Frink
(Continued)

FOREIGN PATENT DOCUMENTS

CN 201048090 Y 4/2008
CN 201219183 Y 4/2009
(Continued)

OTHER PUBLICATIONS

European Search Report and Opinion issued in connection with corresponding EP Application No. 16153120.7 dated Jul. 7, 2016.

*Primary Examiner* — Edwin A. Leon
*Assistant Examiner* — Iman Malakooti
(74) *Attorney, Agent, or Firm* — GE Global Patent Operation; Stephen G. Midgley

(57) ABSTRACT

A fixed contact for joining a bus bar and a sliding contact of an electrical switchgear is provided. The fixed contact includes a plurality of circumferential segments operatively coupled to each other. The fixed contact also includes an axial extent extending along a longitudinal axis of the fixed contact from a first end of the fixed contact to a second end of the fixed contact, the axial extent comprising a mounting region, a central region and a sliding contact engagement region. The mounting region extends axially from the first end of the fixed contact to the central region, the mounting region configured to be operatively coupled to the bus bar. The sliding contact engagement region extends axially from the central region to the second end of the fixed contact, the sliding contact region configured to be slidably engaged with a sliding contact.

16 Claims, 3 Drawing Sheets

(51) Int. Cl.
  *H01H 1/62* (2006.01)
  *H01H 33/02* (2006.01)
  *H02B 11/04* (2006.01)
  *H01H 33/66* (2006.01)

(52) U.S. Cl.
  CPC ..... *H02B 11/04* (2013.01); *H01H 2033/6613* (2013.01)

(58) Field of Classification Search
  USPC .................. 200/50.21, 252; 218/81; 361/605
  See application file for complete search history.

(56) References Cited

U.S. PATENT DOCUMENTS

| | | |
|---|---|---|
| 3,612,799 A | 10/1971 | Hansruedi |
| 2002/0044036 A1 | 4/2002 | Akita |
| 2009/0261071 A1 | 10/2009 | Nufer |
| 2011/0127237 A1 | 6/2011 | Uchii et al. |
| 2013/0048476 A1 | 2/2013 | Choon et al. |
| 2014/0368976 A1* | 12/2014 | Wu ........................ H02B 11/04 361/605 |

FOREIGN PATENT DOCUMENTS

| | | |
|---|---|---|
| CN | 202524000 U | 11/2012 |
| CN | 202695163 U | 1/2013 |

* cited by examiner

FIXED CONTACT FOR JOINING A BUS BAR AND A SLIDING CONTACT OF AN ELECTRICAL SWITCHGEAR

BACKGROUND OF THE INVENTION

The subject matter disclosed herein relates to electrical switchgear assemblies and, more particularly, to a fixed contact for joining a bus bar and a sliding contact.

A switchgear assembly serves as an interface between an electrical supply and an electrical load. The switchgear is arranged in an enclosure that includes a line or bus bar portion and a load or circuit breaker portion. The bus bar portion includes one or more bus bars that are connected to the electrical supply. The circuit breaker portion includes one or more circuit breakers that are electrically connected to the one or more bus bars and an electrical load. The circuit breaker is configured to interrupt a flow of current from the one or more bus bars to the electrical load in the event of an over-current condition, short circuit condition and/or an over/under voltage condition. Generally, the enclosure includes a shutter that separates the bus bar portion from the circuit breaker portion. Extending through the shutter is a plurality of fixed contacts that are each electrical current path joints that connect to a bus bar at one end and a sliding contact at the other end.

Due to the high voltage and current being passed through the switchgear, heat is an issue that is to be addressed. The fixed contacts are components that generate a high amount of heat due to high joint resistance. This is due, in part, to eddy current losses within the fixed contacts and challenges associated with cooling the fixed contacts. The heat generated limits the ampacity of the joint, thereby constraining overall switchgear designs and switchgear ratings.

BRIEF DESCRIPTION OF THE INVENTION

According to one aspect of the invention, a fixed contact for joining a bus bar and a sliding contact of an electrical switchgear is provided. The fixed contact includes a plurality of circumferential segments operatively coupled to each other. The fixed contact also includes an axial extent extending along a longitudinal axis of the fixed contact from a first end of the fixed contact to a second end of the fixed contact, the axial extent comprising a mounting region, a central region and a sliding contact engagement region. The mounting region extends axially from the first end of the fixed contact to the central region, the mounting region configured to be operatively coupled to the bus bar. The sliding contact engagement region extends axially from the central region to the second end of the fixed contact, the sliding contact region configured to be slidably engaged with a sliding contact.

According to another aspect of the invention, an electrical switchgear includes a housing and a shutter disposed within the housing and separating the electrical switchgear into a bus bar portion and a circuit breaker portion. Also included is an electrical conductor located within the bus bar portion. Further included is a sliding contact located within the circuit breaker portion. Yet further included is a fixed contact electrically connecting the electrical conductor and the sliding contact, the fixed contact extending through the shutter. The fixed contact includes an axial extent extending along a longitudinal axis of the fixed contact from a first end of the fixed contact to a second end of the fixed contact, the axial extent comprising a mounting region, a central region and a sliding contact engagement region. The mounting region extends axially from the first end of the fixed contact to the central region, the mounting region configured to be operatively coupled to the electrical conductor. The sliding contact engagement region extends axially from the central region to the second end of the fixed contact, the sliding contact region configured to be slidably engaged with the sliding contact. The fixed contact further includes a channel extending along the sliding contact engagement region and defined by the fixed contact.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
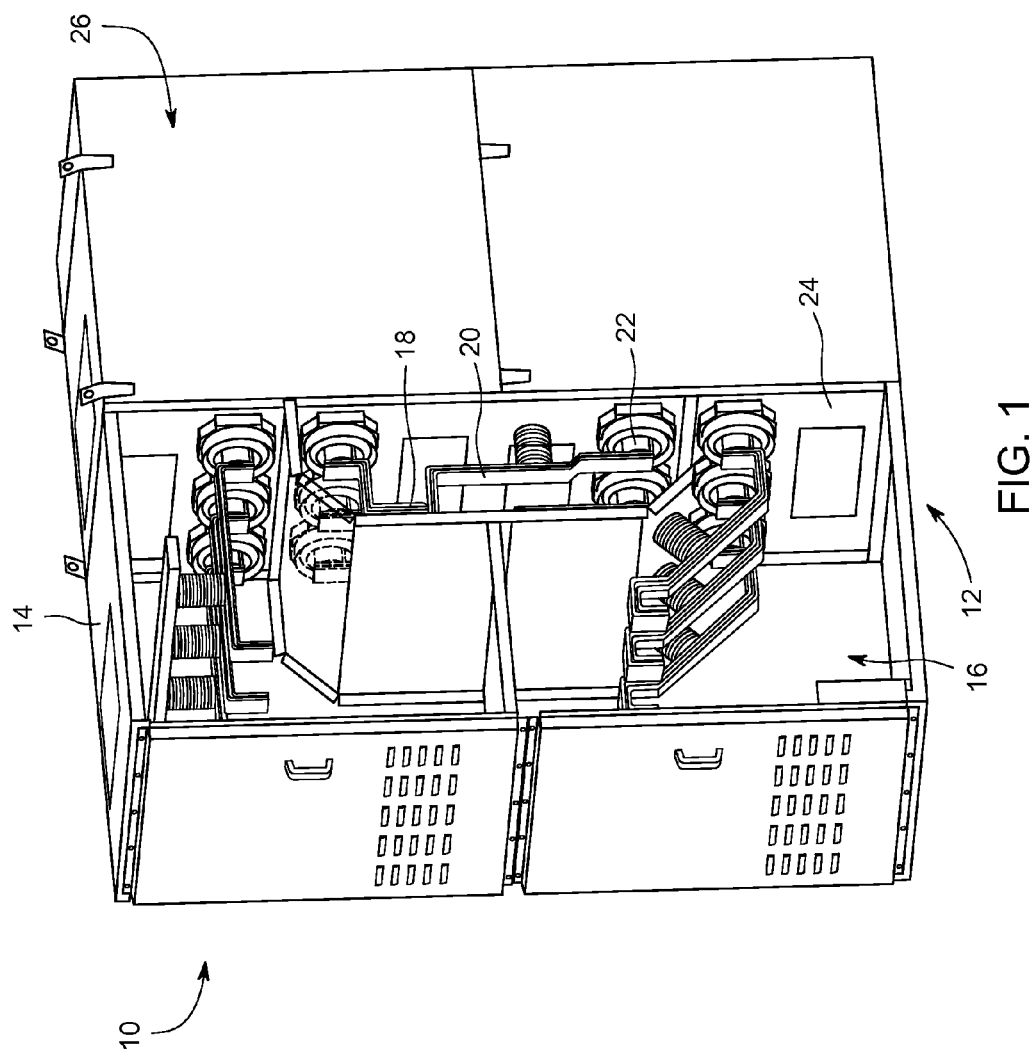
FIG. 1 is a perspective view of an electrical switchgear.

Referring to FIG. 1, an electrical enclosure, in accordance with an embodiment, is indicated generally with reference numeral 10. The electrical enclosure 10 is shown in the form of an electrical switchgear 12 having a housing 14. The housing 14 includes a bus bar portion 16 that houses one or more electrical bus bar assemblies. The illustration has a portion of the housing 14 removed to show certain components of the bus bar portion 16 for clarity. The bus bar assembly comprises a main bus bar 18 and at least one, but typically a plurality of branch bus bars 20, with each of the branch bus bars 20 providing an electrical conduction path to a fixed contact 22. The housing 14 also includes a shutter 24 that provides a selectively moveable barrier between the bus bar portion 16 and a circuit breaker portion 26. The shutter 24, in combination with the housing 14, defines the bus bar portion 16 and the circuit breaker portion 26.

As shown, the branch bus bar 20 is connected to the fixed contact 22. The connection may be a direct coupling or may include intermediate mounting components to operatively couple the branch bus bar 20 to the fixed contact 22. As a non-limiting alternative, a cable or cable arrangement may be used to form an electrical conduction path by connection with the fixed contact 22.

Figure 2:
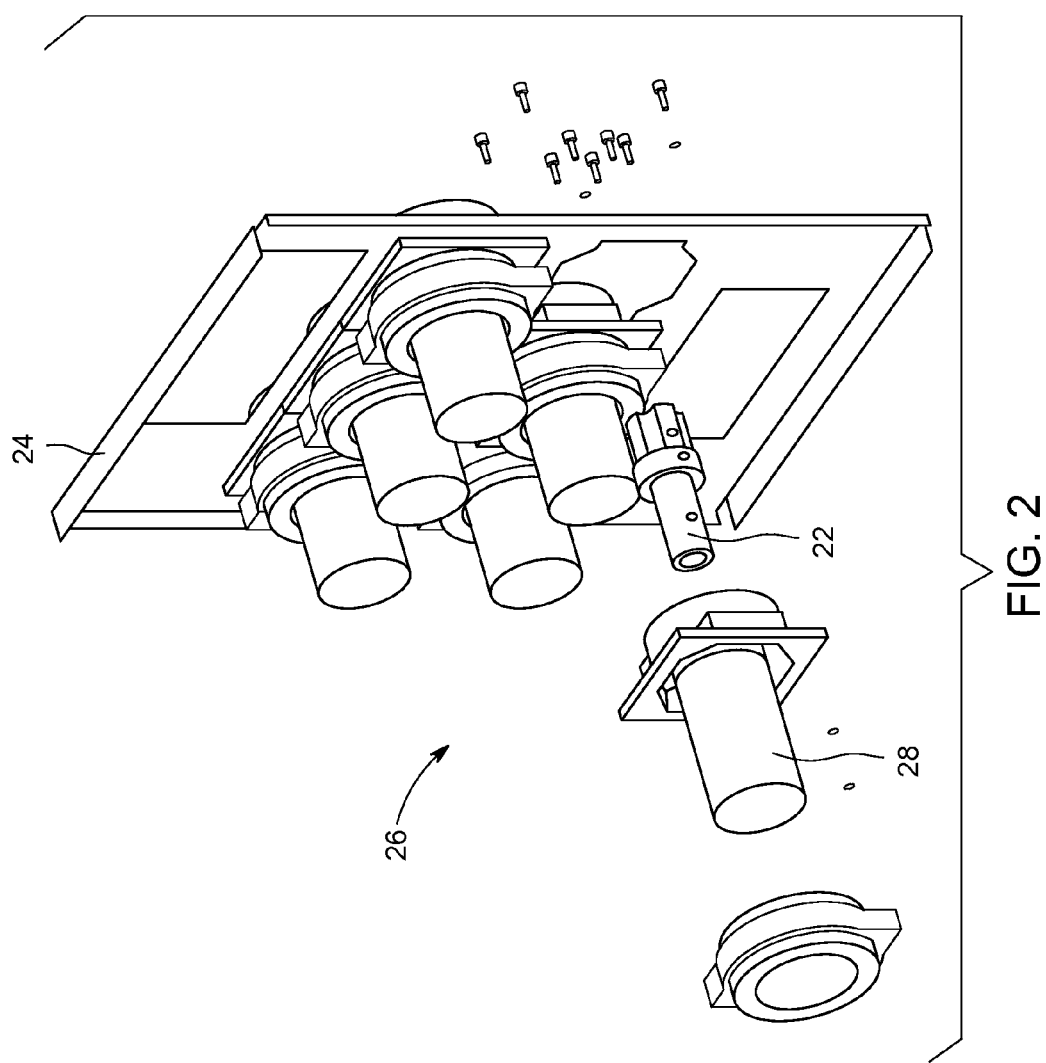
FIG. 2 is a perspective, partially disassembled view of a portion of a circuit breaker portion of the electrical switchgear illustrating a fixed contact and a spout for connecting a sliding contact thereto.

Referring now to FIG. 2, a partial disassembled view of the circuit breaker portion 26 is shown, with the perspective taken from an opposite side of the shutter 24 as that illustrated in FIG. 1. Illustrated is a plurality of spouts 28 that are mounted to the shutter 24 and fit over the fixed contact 22. Each spout facilitates sliding engagement of a sliding contact with the fixed contact 22. Upon connection of the fixed contact 22 to the branch bus bar 20 and the sliding contact, an electrical path is routed through the joint formed by the components from the bus bar portion 16 to the circuit breaker portion 26 of the electrical switchgear 12.

Typically, a high voltage and current are passed through the fixed contact 22. By way of a non-limiting example, the voltage passing through the fixed contact 22 is about 15,000 Volts and the current passing through the fixed contact 22 is about 2,000 Amps. Due to the high power passing through the fixed contact 22 and associated eddy currents circulating throughout the fixed contact 22, the temperature rise of the fixed contact 22 is a consideration.

Figure 3:
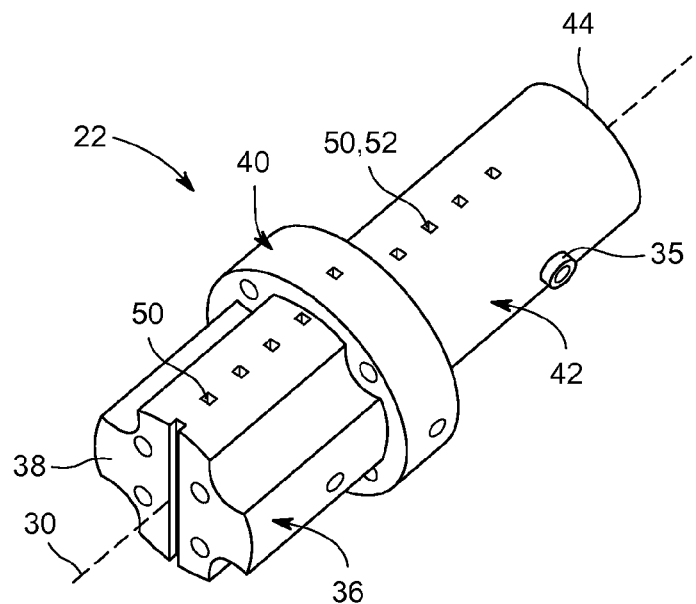
FIG. 3 is a perspective view of the fixed contact.
Figure 4:
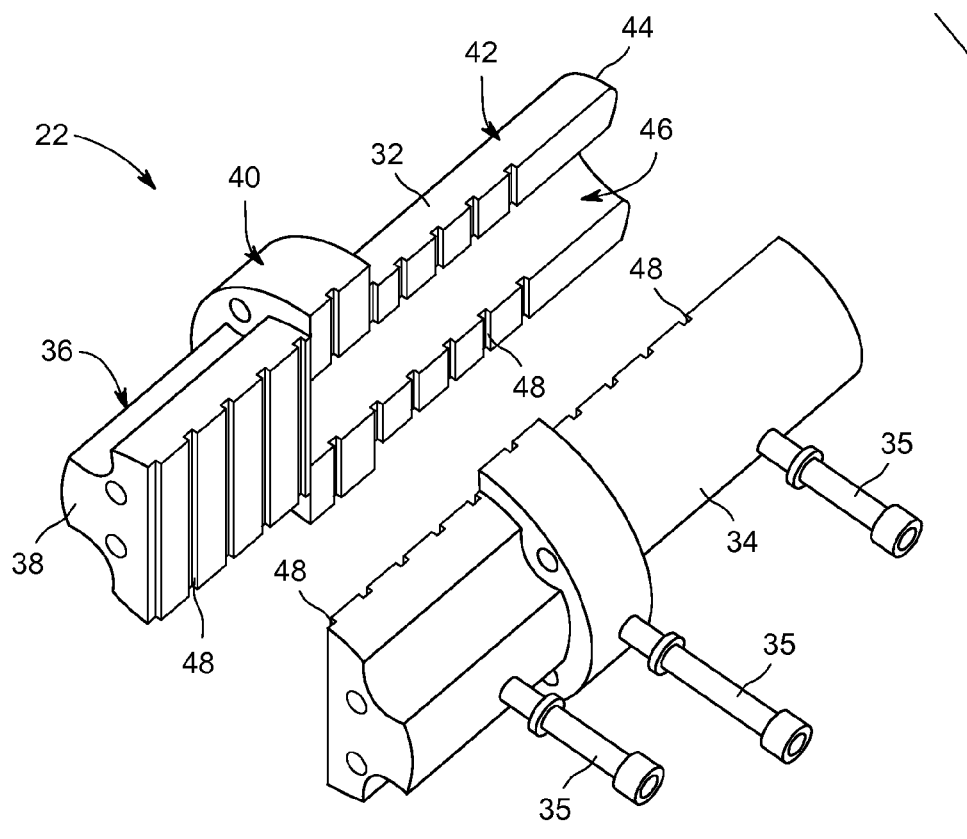
FIG. 4 is a perspective view of the fixed contact in a disassembled view to illustrate a plurality of circumferential segments of the fixed contact.

Referring to FIGS. 3 and 4, the fixed contact 22 is illustrated in greater detail. As will be appreciated from the description herein, the features of the fixed contact 22 enhance air circulation and reduce operating temperature of the fixed contact 22.

The fixed contact 22 is disposed about an axis 30 that extends in a longitudinal axial direction of the fixed contact 22. The fixed contact 22 comprises a plurality of circumferential segments that are operatively coupled to form the fixed contact 22. In the illustrated non-limiting embodiment, two segments are included and are referred to as a first segment 32 and a second segment 34. It is to be appreciated that more than two circumferential segments may be included and operatively coupled to form the overall fixed contact. In the illustrated embodiment with the first segment 32 and the second segment 34, each segment forms half of the overall fixed segment, but other angular arrangements are contemplated. Irrespective of the precise number of circumferential segments and the angular segment that each comprises, the segments are operatively coupled to each other. The coupling may be done with one or more mechanical fasteners 35, such as a non-magnetic bolt.

Upon coupling the segments together, the fixed contact 22 is formed. The entirely formed fixed contact includes distinct regions. A mounting contact region 36 extends axially from a first end 38 of the fixed contact 22 to a central region 40 of the fixed contact 22. The mounting contact region 36 is the portion of the fixed contact 22 that is coupled to the branch bus bar 20. A sliding contact engagement region 42 extends axially from a second end 44 of the fixed contact 22 to the central region 40. The sliding contact engagement region 42 is the portion of the fixed contact 22 that is configured to engage the sliding contact in a sliding manner.

As described above, heating of the fixed contact 22 is a consideration. By splitting the fixed contact 22 into a plurality of circumferential segments, the eddy current fringe is broken due to the breaks in the fixed contact 22. Breaking the eddy current fringe reduces the losses of eddy currents which reduces the heat generated due to eddy current losses.

In addition to breaking the eddy current fringe, to improve air circulation and overall cooling within the fixed contact 22, a channel 46 is formed at an interior location of the fixed contact 22. The channel 46 is defined by the plurality of circumferential segments upon coupling the segments to form the entire fixed contact. The channel 46 extends along the axis 30 within at least a portion of the sliding contact engagement region 42. In one embodiment, the channel 46 extends along the entire length of the sliding contact engagement region 42 and it is contemplated that the channel 46 extends further, so as to extend into the mounting contact region 36 of the fixed contact 22.

In addition to the formation of the channel 46 with the inner profiles of the circumferential segments, additional inner profile features are provided to form additional cooling features of the fixed contact 22. In particular, at least one, but typically a plurality of slots 48 is formed along inner surfaces of the circumferential segments. Upon coupling of the circumferential segments, the slots form at least one, but typically a plurality of apertures 50. The plurality of apertures 50 may be formed by each slot itself or by aligning each slot with another slot to form a larger aperture. The aperture(s) may be located in various locations along the fixed contact 22. In one embodiment, one or more exhaust apertures 52 fluidly couple the channel 46 to an external region of the fixed contact 22. Alternatively, or in combination with the exhaust apertures 52, one or more apertures may be formed in portions of the fixed contact 22 where the channel 46 is not present, such as the embodiment shown in FIG. 4.

The channel 46 and the plurality of apertures 50 form a cooling network that convectively cools the fixed contact 22 by facilitating the flow of air through interior regions of the fixed contact 22. Although described as a plurality of circumferential segments, it is contemplated that a single segment forms the fixed contact 22, with the channel 46 and apertures machined therein to form the cooling network.

Advantageously, in embodiments having a plurality of circumferential segments and the cooling network described in detail above, a significant operating temperature reduction of the fixed contact 22 is achieved. This is done by breaking the eddy current fringe with the breaks in the fixed contact 22, as well as by increasing the surface area of the fixed contact 22 that is subjected to an airflow. The channel 46 and plurality of apertures enhance airflow distribution to surfaces of the fixed contact 22 that would not otherwise be subjected to convective cooling.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fixed contact for joining a bus bar and a sliding contact of an electrical switchgear comprising:
    a plurality of circumferential segments operatively coupled to each other with at least one non-magnetic mechanical fastener;
    the fixed contact having an axial extent extending along a longitudinal axis of the fixed contact from a first end of the fixed contact to a second end of the fixed contact, the axial extent comprising a mounting region, a central region and a sliding contact engagement region;
    the mounting region extending axially from the tint end of the fixed contact to the central region, the mounting region configured to be operatively coupled to the bus bar; and
    the sliding contact engagement region extending axially from the central region to the second end of the fixed contact, the slide z contact re ion configured to be slidably engaged with a sliding contact.

2. The fixed contact of claim 1, further comprising a channel defined by the plurality of circumferential segments.

3. The fixed contact of claim 2, the channel extending along a portion of the sliding contact engagement region.

4. The fixed contact of claim 2, the channel extending along an entire length of the sliding contact region.

5. The fixed contact of claim 2, further comprising at least one exhaust aperture fluidly coupling the channel to an external region of the fixed contact.

6. A fixed contact for joining a bus bar and a sliding contact of an electrical switchgear, comprising:
a plurality of circumferential segments, comprising a first segment and a second segment operatively coupled to each other;
the fixed contact having an axial extent extending along a longitudinal axis of the fixed contact from a first end of the fixed contact to a second end of the fixed contact, the axial extent comprising a mounting region, a central region and a sliding contact engagement region;
the mounting region extending axially from the first end of the fixed contact to the central region, the mounting region configured to be operatively coupled to the bus bar; and
the sliding contact engagement region extending axially from the central region to the second end of the fixed contact, the sliding contact region configured to be slidably engaged with a sliding contact,
further comprising a plurality of slots formed in the first segment and the second segment, each of the plurality of slots of the first segment aligned with a corresponding slot of the second segment to define a plurality of apertures when the first segment and the second segment are operatively coupled.

7. The fixed contact of claim 6, wherein the first segment and the second segment each form half of the fixed contact.

8. An electrical switchgear comprising:
a housing;
a shutter disposed within the housing and separating the electrical switchgear into a bus bar portion and a circuit breaker portion;
an electrical conductor located within the bus bar portion;
a sliding contact located within the circuit breaker portion; and
a fixed contact comprising a plurality of circumferential segments operatively coupled to each other with at least one non-magnetic mechanical fastener, electrically connecting the electrical conductor and the sliding contact, the fixed contact extending through the shutter, the fixed contact having an axial extent extending from a first end of the fixed contact to a second end of the fixed contact, the axial extent comprising a mounting region, a central region and a sliding contact engagement region;
the mounting region extending axially from the first end of the fixed contact to the central region, the mounting region configured to be operatively coupled to the bus bar electrical conductor;
the sliding contact engagement region extending axially from the central region to the second end of the fixed contact, the sliding contact region configured to be slidably engaged with the sliding contact; and
a channel extending along the sliding contact engagement region and defined by the fixed contact.

9. The electrical switchgear of claim 8, wherein the channel is defined by the plurality of circumferential segments.

10. The electrical switchgear of claim 8, wherein the first segment and the second segment each form half of the fixed contact.

11. The electrical switchgear of claim 8, the channel extending along a portion of the sliding contact engagement region.

12. The electrical switchgear of claim 8, the channel extending along an entire length of the sliding contact region.

13. The electrical switchgear of claim 8, further comprising at least one exhaust aperture fluidly coupling the channel to an external region of the fixed contact.

14. The electrical switchgear of claim 8, wherein the electrical conductor comprises a bus bar.

15. The electrical switchgear of claim 8, wherein the electrical conductor comprises at least one cable.

16. An electrical switchgear, comprising:
a housing;
a shutter disposed within the housing and separating the electrical switchgear into a bus bar portion and a circuit breaker portion;
an electrical conductor located within the bus bar portion;
a sliding contact located within the circuit breaker portion; and
a fixed contact comprising a first segment and a second segment;
electrically connecting the electrical conductor and the sliding contact, the fixed contact extending through the shutter and comprising:
the fixed contact having an axial extent extending from a first end of the fixed contact to a second end of the fixed contact, the axial extent comprising a mounting region, a central region and a sliding contact engagement region;
the mounting region extending axially from the first end of the fixed contact to the central region, the mounting region configured to be operatively coupled to the bus bar electrical conductor;
the sliding contact engagement region extending axially from the central region to the second end of the fixed contact, the sliding contact region configured to be slidably engaged with the sliding contact; and
a channel defined by the first and second segments extending along the sliding contact engagement region; and
a plurality of slots formed in the first segment and the second segment, each of the plurality of slots of the first segment aligned with a corresponding slot of the second segment to define a plurality of apertures when the first segment and the second segment are operatively coupled.

* * * * *